United States Patent Office 3,064,780
Patented Nov. 20, 1962

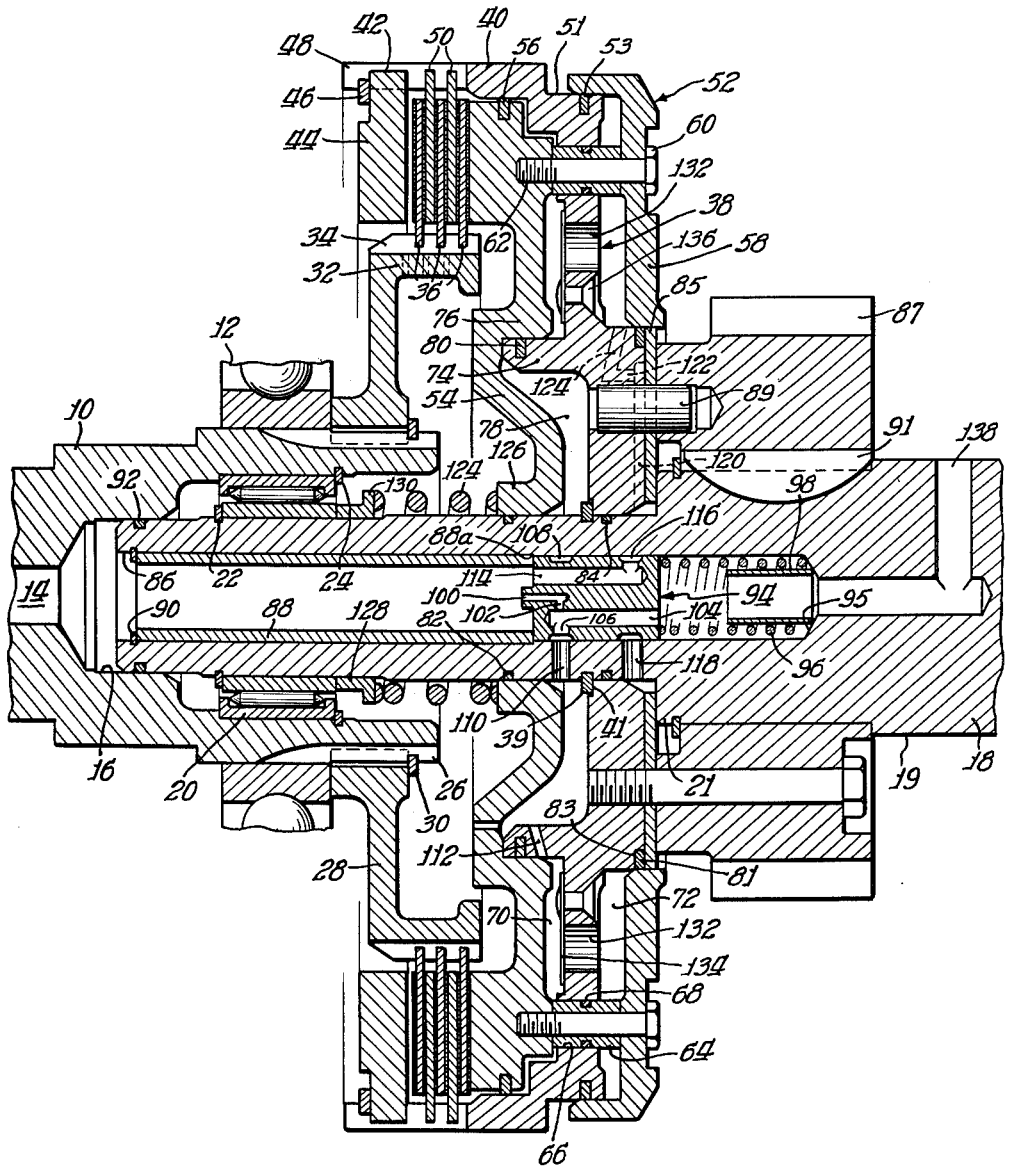

3,064,780
HYDRAULIC CLUTCH
Elmer A. Richards and Joseph B. Snoy, Rockford, Ill., assignors to Borg-Warner Corporation, Chicago, Ill., a corporation of Illinois
Filed May 14, 1958, Ser. No. 735,180
5 Claims. (Cl. 192—86)

This invention relates to hydraulically operated clutch mechanisms, and more particularly to a hydraulic clutch of the single acting type in which a piston is hydraulically actuated for engagement of interleaved discs of disc pack clutch.

A primary object of the invention is to provide a single acting hydraulic clutch which may be instantaneously operated and which is maintained in a condition of hydraulic balance so that inadvertent engagement of the discs due to centrifugal force acting on the hydraulic fluid is precluded.

Another object of the invention is to provide a hydraulic clutch of the stated type wherein an inner annular primary chamber is provided for reception of fluid under pressure for movement of the piston and wherein a pair of axially spaced fluid-filled outer annular secondary chambers are provided to assure instantaneous engagement of the discs and to afford hydraulic balance.

A further object of the invention is to provide a new and improved hydraulic clutch which is simple, reliable and relatively inexpensive, and which furthermore operates to effect clutch actuation much more rapidly than was heretofore possible with comparable devices.

Another object of the invention in accordance with the preceding objects in which communication is afforded in one direction between the two outer chambers and in which communication is afforded between the primary chamber and one of the secondary chambers.

A further object of the invention is to provide a hydraulic clutch of the stated type wherein the piston is so positioned after the disengagement as to be readily available for a subsequent engagement.

A further object of the invention is to provide a hydraulic clutch in which the secondary fluid chambers are defined by an axially fixed reaction plate and a bipartite piston and wherein the flow of fluid from one of the chambers to the other of the chambers is effected by movement of one of the piston sections.

Another object of the invention is to provide a hydraulic clutch of the stated type wherein means are provided for assuring a hydraulic pressure balance on each side of the reaction plate when the clutch is disengaged and wherein means are provided for assuring access to the inner chamber for high pressure fluid to move the piston axially when engagement of the clutch is desired.

A more particular object of the invention is to provide a hydraulic clutch of the stated type wherein driving clutch discs may be frictionally engaged with interleaved clutch discs connected to a driven member by means of fluid pressure, wherein the fluid under pressure is supplied through an axial bore in a driven shaft and wherein a plug is slidably mounted in the shaft bore to afford a constant supply of low pressure fluid to the several chambers and wherein the plug is movable axially against the force of the spring to afford a supply of high pressure fluid to the primary chamber and terminate the supply of fluid to one of the secondary chambers.

This invention consists of the novel constructions, arrangements, and devices to be hereinafter described and claimed for carrying out the above stated objects and such other objects as will be apparent from the following description of preferred forms of the invention, illustrated with reference to the accompanying drawings, wherein:

The sole FIGURE is a vertical sectional view of a hydraulic clutch made in accordance with the present invention.

Referring to the drawing, reference numeral 10 indicates a longitudinally extending rotatable input shaft adapted for connection to a prime mover, such as an internal combustion engine or the like. The shaft 10 is shown as journalled in a bearing assembly 12 and has a bore 14 for supplying hydraulic fluid under pressure in a manner hereinafter apparent, and a bore 16 in which one end of an output shaft 18 is received. The shaft 18 has an enlarged portion 19 defined by a shoulder 21. The shaft 10 is journalled on the shaft 18 by means of a needle bearing assembly 20 which is maintained in a fixed axial position by means of a retainer ring 22 received in a suitable groove in the shaft 18 and a retainer ring 24 received in a suitable groove in the shaft 10. Mounted on the shaft 10 for conjoint rotation, by means of splines 26, is a hub 28 which is fixed axially by a retainer ring 30 received in a suitable groove in the outer periphery of the shaft 10. The hub 28 includes an axially extending flange 32 having at its outer periphery a plurality of splines 34 on which are mounted a plurality of clutch discs 36 comprising a first clutch engaging means.

An annular reaction plate 38 surrounds the shaft 18 and is axially fixed with respect thereto by a retainer ring 39 received in a recess 41 at one side of the inner periphery of the reaction plate and in a suitable peripheral groove in the shaft 18. It will be noted that the right side of the plate 38 abuts the shoulder 21. Formed integrally with the reaction plate 38 is an axially extending annular flange 40 having at its inner periphery a plurality of splines 48 on which are mounted a plurality of clutch discs 50 comprising a second clutch engaging means and interleaved with the clutch discs 36; an annulus 44 is meshed at 42 with the splines 48 and retained in the position illustrated by a retainer ring 46. The discs 36 and 50 are mounted for limited axial movement for driving the shaft 18 in a manner hereafter apparent. The flange 40 has a reduced portion 51 provided with an annular groove for reception of a sealing ring 53 for a purpose hereafter described.

According to the present invention, the discs 36 and 50 may be engaged by movement of a piston 52 to the left, as viewed in the drawing, and may be disengaged by movement of the piston means 52 to the right. The piston 52 is bipartite in construction and includes a first section 54 having at its outer periphery a suitable groove for reception of a sealing ring 56, and a second section 58 secured in spaced relation to the first section 54 by means of a plurality of circumferentially spaced screws 60 received in suitably threaded openings 62 in the first section 54. The spacing between the sections 54 and 58 is maintained by spacing collars 64 received in openings 66 in the reaction plate 38 and surrounding the screws 60. Each of the collars 64 is provided at its outer periphery with a suitable groove for reception of a sealing ring 68. The sections 54 and 58, together with the reaction plate 38, define secondary fluid chambers 70 and 72 in which fluid at substantially equal pressure is received for prevention of inadvertent engagement of the clutch discs 36 and 50 and for assuring instantaneous engagement of the clutch in a manner hereafter apparent.

The reaction plate 38 has an axially extending ledge 74 with a cylindrical and axially disposed surface slidably engaged by a cylindrical and axially disposed surface carried on a ledge 76 integrally formed with the first section 54. It will be seen that the first section 54 and the reaction plate 38 together form a primary annular pressure chamber 78 adjacent the shaft 18. The outer periphery of the ledge 74 is suitably grooved for reception of a sealing ring 80. Fluid integrity of the chamber 70 is maintained by the seals 56 and 80, while the chamber 72 is maintained fluid tight by the seal 53 and a sealing ring 81 received in an annular recess 83 at one side of the reaction plate 38. An end plate 85 retains the seal 81 in position. To permit expansion of chamber 72, section 58 carries a cylindrical surface disposed axially and in sliding engagement with a cylindrical surface carried by the reaction plate. This end plate is shown in abutting relation to an output gear 87 secured to the plate 38 by drive pins 89 (only one of which is shown), received in suitable openings in the plates 38 and 85 and the gear 87, which is illustrated as secured to the shaft 18 by a key 91. The fluid tight integrity of the chamber 78 is assured by means of the sealing ring 80 and sealing rings 82 and 84 received in suitable grooves of the outer periphery of the shaft 18.

The manner in which fluid is supplied to the several chambers 78, 70 and 72 will now be described. The shaft 18 is provided with an axial bore 86 in which is snugly received an imperforate sleeve or tube 88 retained in abutment with a shoulder 88a by a retainer ring 90 received in a suitable groove in the inner periphery of the shaft 18. Fluid under pressure may be fed from a suitable source through the bore 14 and thence into the interior of the tube 88. Leakage around the shaft 18 is precluded by means of a sealing ring 92 received in a suitable groove in the outer periphery of the shaft. Slidably received in the bore 86 is a plug 94 which is biased to the position illustrated by means of a compression spring 96 which abuts a shoulder 95 at the inner extremity of the bore 86 and is retained in position by means of a retainer sleeve 98.

The plug 94 has a central bore 100 of limited diameter, communicating with a radially extending passage 102 which in turn communicates with an offset bore 104 opening to the opposite side of the plug 94. Communicating with the bore 104 is a radially extending passage 106 and an annular groove 108 at the outer periphery of the plug 94. In the position of the plug illustrated, hydraulic fluid at low pressure may pass from the interior of the tube 88 through the bore 100 and 102, across the bore 104, into the bore 106 and the groove 108, and into the chamber 78 through an axially extending passage 110 in the wall of the shaft 18. Fluid is supplied to the chamber 70 from the chamber 78 by means of a passage 112 in the ledge 74.

In the illustrated position of the plug 94, fluid may be supplied to the chamber 72 by means of a bore 114, an annular groove 116 at the outer surface of the plug 94, a passage 118 in the wall of the shaft 18, and passages 120, 122 and 124 in the body of the reaction plate 38. The fluid pressure may be minimal; centrifugal force assures filling of the chambers 70, 72 and 78. It will thus be seen that fluid under pressure is supplied to the chambers 70, 72 and 78 at all times.

The piston 52 is normally biased out of engagement by means of a compression spring 124 surrounding the shaft 18 and abutting at one end an axially extending flange 126, integrally formed with the first section 54, and at the other end a retainer ring 128 having a radially outwardly extending flange 130. The left end of the ring 128, as viewed in the drawing, engages the needle bearing assembly 20.

In operation, the clutch of the present invention may be energized by increasing the pressure of the fluid within the bore 86. When the fluid pressure is increased, the plug 94 is moved to the right, against the force of the compression spring 96, an access is afforded for flow of pressure fluid through the chamber 78 by means of the passage 110. As the pressure within the chamber 78 increases, the piston 52 is urged to the left, against the force of the spring 124, the volume of chamber 70 is increased, while the volume of chamber 72 is decreased. According to the present invention, the reaction plate 38 is provided with a plurality of circumferentially spaced openings 132 for passage of fluid from the chamber 72 to the chamber 70 when the piston section 54 is moved into engagement with the disc pack. Each of the openings 132 is covered by a flap valve 134 of te flat spring type secured in position by a rivet 136. By this arrangement, fluid flow is afforded in one direction only, as will be apparent. It will be noted that when the plug 94 is moved to the right the passage 118 is blocked off and fluid communication between the pressure source and the chamber 72 is temporarily interrupted.

To disengage the clutch of the present invention, the pressure of the fluid within the bore 86 is decreased, the plug 94 is returned to the position illustrated by the spring 96, high pressure fluid flows from the chamber 78 to sump by means of the passage 110, the groove 108, the bore 104 and a radial passage 138 in the shaft 18. As the piston 52 moves to the right under the force of the spring 124, the volume of the chamber 70 decreases while the volume of the chamber 72 increases until the section 54 abuts the ledge 74. Fluid from the chamber 70 passes into the chamber 78 through the passage 112 until the section 54 reaches its rest position and flow of fluid to the chamber 72 by way of the passages 118, 120, 122 and 124 is resumed.

The above described hydraulic clutch exhibits important advantages over hydraulic clutches of conventional type. For instance, centrifugal force, acting on the fluid within the chamber 70 tending to urge the piston section 54 into engagement with the disc pack is substantially equal to the centrifugal force acting on the fluid with the chamber 72. Thus, the resultant force is zero and the present clutch is actuated only when desired. The flow of fluid from the chamber 72 to the chamber 70 assures a positive supply of fluid for the expanding chamber 70. It will be noted that actuation of the clutch may be effected when the relatively small chamber 78 is subjected to high pressure fluid. However, holding capacity of the clutch is determined by high pressure fluid acting on the sum of the areas of the piston 54 defining the chamber 70 and chamber 78.

While we have described our invention in connection with certain specific constructions and arrangements it is to be understood that this is by way of illustration and not by way of limitation and the scope of our invention is defined solely by the appended claims which should be construed as broadly as the prior art will permit.

We claim:

1. A hydraulic clutch comprising a rotatable input shaft, an output shaft having an axial bore, a clutch pack having a plurality of discs adapted to be driven by one of said shafts and a plurality of inter-leaved discs adapted to be driven by said first-named discs, an axially fixed rotatable reaction plate, a piston means having a first section on one side of said reaction plate and a second section on the other side of said reaction plate, said first section defining in cooperation with said reaction plate a primary chamber adjacent said output shaft for reception of high pressure fluid and a first secondary chamber spaced from said primary chamber, said second section defining in cooperation with said reaction plate a second secondary pressure chamber in axial alignment with said first secondary pressure chamber, means for normally supplying low pressure fluid to said primary chamber and said secondary chambers, means responsive to an increase of pressure of the hydraulic fluid for supplying high pressure fluid to said primary chamber and for terminating the supply of fluid to said second secondary chamber, means affording passage of fluid from said second secondary chamber to said first secondary chamber when the pressure of fluid in said primary chamber is increased, and a plug axially slidable in said output shaft bore and normally biased into a position in which low pressure fluid is supplied to each of said chambers, said plug being movable axially to a position in which high pressure fluid is supplied to said primary chamber and the supply of fluid to said second secondary chamber is terminated.

2. A hydraulic clutch comprising a rotatable input shaft, an output shaft having an axial bore, a clutch pack having a plurality of discs adapted to be driven by one of said shafts and a plurality of inter-leaved discs adapted to be driven by said first-named discs, an axially fixed rotatable reaction plate, a piston means having a first section on one side of said reaction plate and a second section on the other side of said reaction plate, said first section defining in cooperation with said reaction plate a primary chamber adjacent said output shaft for reception of high pressure fluid and a first secondary chamber spaced outwardly from said primary chamber, said second section defining in cooperation with said reaction plate a second secondary pressure chamber in communication with said first secondary pressure chamber, means for normally supplying low pressure fluid to said primary chamber and said secondary chambers, means responsive to an increase of pressure of the hydraulic fluid for supplying high pressure fluid to said primary chamber and for terminating the supply of fluid to said second secondary chamber, means affording passage of fluid from said second secondary chamber to said first secondary chamber when the pressure of fluid in said primary chamber is increased, and a plug slidable in said bore and normally biased to a position in which low pressure fluid is supplied to each of said chambers, said plug being movable axially to a position in which high pressure fluid is supplied to said primary chamber and the supply of fluid to said second secondary chamber is terminated, said plug being provided with a passage for supplying fluid to said primary chamber and to said first secondary chamber and a second passage for supplying fluid to said second secondary chamber, said secondary chambers being constructed and arranged so that the centrifugal force acting on the fluid in one of the secondary chambers is cancelled by the centrifugal force acting on the fluid in the other of said chambers.

3. A fluid operated clutch, comprising: a rotatable input shaft; a first clutch means drivingly connected to said input shaft; a rotatable output shaft; a second clutch means drivingly connected to said output shaft; an annular reaction plate mounted on one of said shafts in axially fixed position and disposed normally to said one shaft; piston means slidably mounted on said one shaft having a first section on one side of said reaction plate and a second section on the other side of said reaction plate, said reaction plate defining in conjunction with said first section, a first fluid chamber and a second fluid chamber, said reaction plate having a restricted flow orifice communicating said first and second chambers, said reaction plate defining in conjunction with said second section a third fluid chamber; means responsive to movement of said first and second sections to permit transfer of fluid only from the third to the second chamber, said transfer means being the sole means within the clutch providing for fluid transfer between said second and third chambers; and means supplying low pressure fluid to said third chamber and means for selectively supplying high pressure fluid and low pressure fluid to said first and second chambers whereby said first and second sections may be selectively actuated axially causing fluid to flow in one direction between said second and third chambers.

4. A fluid operated clutch as in claim 3, in which said reaction plate has an annular cylindrical surface disposed axially and said piston means having an annular cylindrical surface disposed axially; said surfaces being in sliding engagement and adapted to provide in part for the definition of said first and second chambers by said piston means and said reaction plate.

5. A fluid operated clutch as in claim 3, in which said transfer means comprises a plurality of openings formed in said reaction plate and flap valves normally closing off said openings to fluid flow, said flap valves being operable when the fluid in said third chamber exceeds the pressure in said second chamber.

References Cited in the file of this patent

UNITED STATES PATENTS

| | | |
|---|---|---|
| 2,258,463 | Moncrieff | Oct. 7, 1941 |
| 2,328,909 | Nutt et al. | Aug. 31, 1943 |
| 2,330,024 | Beardsley | Sept. 21, 1943 |
| 2,632,544 | Hockert | Mar. 24, 1953 |
| 2,868,341 | Snoy | Jan. 13, 1959 |

FOREIGN PATENTS

| | | |
|---|---|---|
| 564,638 | Great Britain | Oct. 6, 1944 |